Nov. 17, 1931.  E. C. NEWCOMB  1,832,726
INTERNAL COMBUSTION ENGINE
Filed Feb. 27, 1928
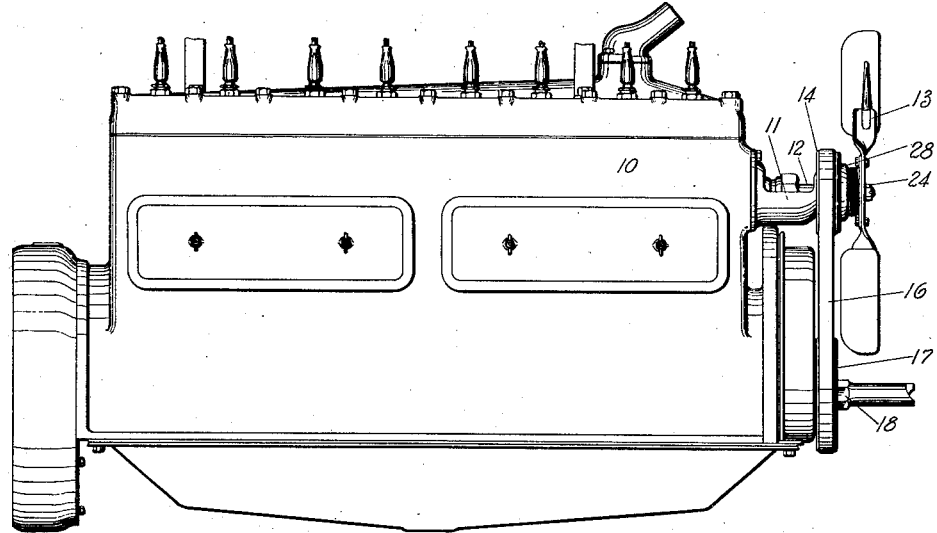
Fig.1
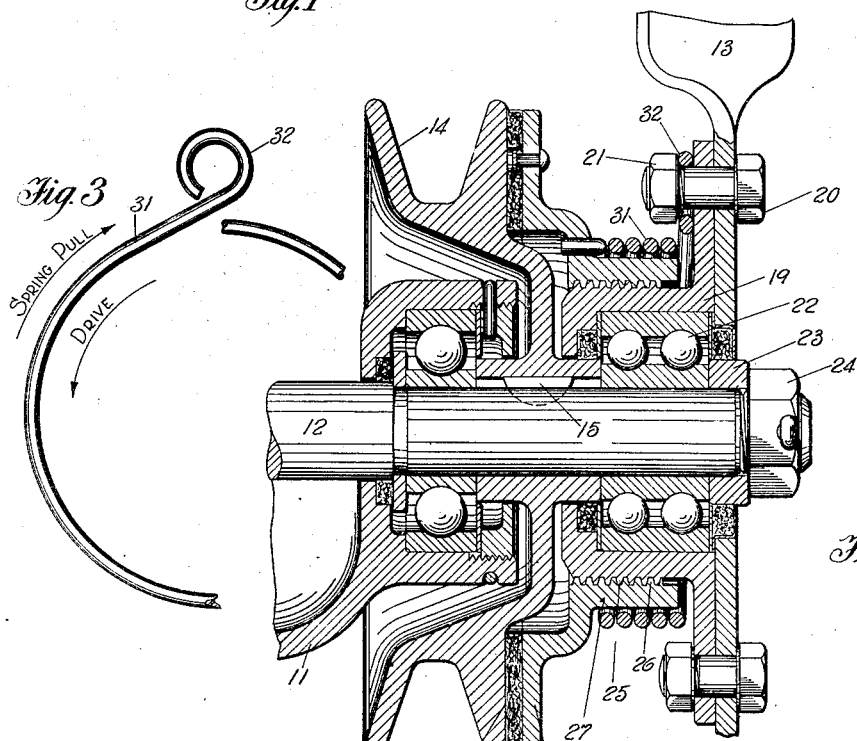
Fig.3
Fig.2
INVENTOR.
Edward C Newcomb
BY P. W. Pomeroy
ATTORNEY Patented Nov. 17, 1931

1,832,726

UNITED STATES PATENT OFFICE

EDWARD C. NEWCOMB, OF SOUTH BEND, INDIANA

INTERNAL COMBUSTION ENGINE

Application filed February 27, 1928. Serial No. 257,258.

This invention relates to internal combustion engines and more particularly to cooling fans therefor.

It has been the practice in the past to use fans for cooling internal combustion engines which were positively driven by the engines at all speeds of the same. In the following specification, an engine having a top speed of 3800 revolutions per minute will be taken as an illustration, but it is to be understood however, that the figures used may vary according to the size and design of the engine. Extensive tests have been conducted on the cooling of internal combustion engines and it has been observed that artificial cooling is necessary for all speeds of the engine described above up to 2000 revolutions per minute, which is equivalent to approximately forty-five miles per hour. It has been found from these tests that the wind passing through the radiator is sufficient to cool the engine without the use of artificial means when the motor vehicle is operated at forty-five miles per hour and at all speeds above that speed. There are several objections to using artificial cooling means, such as a conventional fan, at engine speeds of 2000 revolutions or over, several of which are noise, fan belt breakage, and loss of available horsepower. When a cooling fan is rotated at an engine speed of 2000 revolutions or over, the air drawn in and passing through the fan blades travels at such a high rate of speed that it creates a very annoying hum which is very disagreeable to the occupants of the motor vehicle.

Considerable force is required to drive a fan at an engine speed of 3800 revolutions per minute and as all the force is transmitted through the fan belt, the belt soon breaks down and it is necessary that the same be replaced. If this occurs several miles from a town where belts of the necessary size are not obtainable, the owner of the vehicle is greatly inconvenienced.

Lastly, whereas it requires only three horsepower to drive the fan when the engine above described is running at a speed of 2000 revolutions per minute, it requires approximately 12 horsepower to drive the same fan when the engine is running at 3800 revolutions per minute. Because of the reason that artificial cooling of the engine is not necessary above 2000 revolutions per minute, it is logical that the practical thing to do, is to disengage the fan when the engine is running at 2000 revolutions per minute and use the horsepower, that is, whatever horsepower is required to drive the fan at the varying speeds above 2000 revolutions per minute. The horsepower available by disengaging the fan gives added economy, increased efficiency and added speed to the vehicle. Hence, it is the principal object of this invention to provide an internal combustion engine with a cooling fan which will automatically be engaged and disengaged at predetermined engine speeds. Thus, as will be apparent, at racing speeds of 3800 R. P. M. the twelve available horsepower is, by virtue of the disengagement, added to the speed of the car.

Another object is to provide an internal combustion engine with a cooling fan which is driven solely by a torsion spring, the spring being adapted when the resistance to rotation of the fan overcomes the torsion therein, to disengage the fan from the driving mechanism.

Another object is to provide an internal combustion engine with a cooling fan, driving means therefor, a friction member frictionally engaging the driving means, and a torsion spring connected to the fan and friction member adapted to disengage the friction member from the driving means when the wind resistance overcomes the torsion of the spring.

A further object is to provide an internal combustion engine with a cooling fan mounted upon a cylindrical hub, driving mechanism therefor, a friction member threadably mounted on the fan hub to frictionally engage the driving mechanism, and a torsion spring connected to the fan and friction member adapted to cause the friction member to rotate on the threaded hub out of engagement of the driving mechanism when the wind resistance encountered by the fan blades overcomes the torsion of the spring.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a side elevation of an internal combustion engine having a cooling fan thereon which will automatically be thrown out of operation at a predetermined engine speed.

Figure 2 is an enlarged longitudinal section of the fan illustrated in Figure 1 showing the construction of the same in detail.

Figure 3 is an elevation of the torsion driving spring as viewed from the rear of the engine, the direction of rotation and the direction of spring pull being shown by arrows.

Referring to the accompanying drawings in which like numerals refer to like parts throughout the several views, the internal combustion engine 10 is provided with a bracket 11 secured to the front end thereof in which a rotatable shaft 12 is journaled. The shaft 12 may be adapted to drive a water pump (not shown) and the cooling fan 13. A pulley 14 is rigidly secured by a key 15 to the shaft 12 so that it will rotate therewith and is driven by a belt 16 which passes over a drive pulley 17 secured to the forward end of the engine crankshaft 18.

The cooling fan 13 is rotated by the fan pulley 14 through a flexible friction connection which is adapted to engage and disengage the same at a predetermined speed of the engine 10 in order that the fan 13 may be operated within the limits of those speeds where artificial cooling of the engine 10 is necessary.

The fan blade assembly is preferably mounted upon and secured to a hollow cylindrical flanged hub 19 by bolts 20 having nuts 21 threaded thereon. The hub 19 telescopically receives a double ball-bearing 22, the non-rotatable portion of which is held against longitudinal movement on the end of the shaft 12 which projects past the driven pulley 14 by a spacer 23 and nut 24 threaded on the end of the shaft 12, so that the same may rotate independently of the shaft 12. The outer circumference of the cylindrical portion of the hub 19 is formed with a plurality of screw threads 25 which receive the internal threaded portions 26 formed in the hub 27 of a disc-shaped friction member 28. Friction facing 29 is suitably secured to the vertical face of the friction member 28 and normally contact with a vertical face 30 of the driven pulley 14.

A torsion spring 31 telescopes the hub 27 of the friction member 28 and one end of the same extends into an opening in the friction member 28. The other extremity of the torsion spring 31 is looped as shown in Figure 3, and is slipped over one end of the bolt 20 which secures the fan 13 to the flange of the fan hub 19. The nut 21 for the bolt 20 securely clamps the loop end 32 of the torsion spring 31 firmly against the flange of the fan hub 19.

It is evident from the foregoing description and drawings, that the fan 13 is driven solely by the torsion spring 31 which normally holds the friction member 28 in engagement with the face 30 of the driven fan pulley 14. The fan 13 is rotated in the direction shown by the drive arrow in Figure 3 and the resistance to rotation in that direction caused by the air it encounters has a tendency to cause the spring 31 to exert a pull in the direction shown by the other arrow. In other words, the spring pull tends to shorten the spring 31 or cause the same to wind up.

In the engine chosen for illustration, it has been stated that it is desirable to have artificial or fan cooling of the engine from zero speed up to 2000 revolutions per minute, and above that speed to have the fan release so that more horsepower will be available. It is necessary then, to design the spring 31 so that the torsion therein is equal to the pressure of the wind acting against the rotating fan blades 32 at an engine speed of 2000 revolutions per minute in order that the spring 31 will not wind up and release the fan. It is now evident with the torsion in the driving spring 31 equal to the wind pressure against the fan 13 at 2000 revolutions per minute, when the engine 10 is speeded up above 2000 revolutions per minute, that the resistance to rotation of the fan 13 causes the spring 31 to shorten and wind up. This shortening of the spring 31 forces the friction member 28 to rotate in the direction of pull in the spring and to thread itself on the screw threads 25 outwardly away from the surface 30 of the fan pulley 14 thereby releasing the fan 13 from the driving mechanism. The fan 13 in this condition, is free to rotate independently of the driving means and no horsepower is used to drive the fan. The screw threads on the hub 19 of the fan 13 and the hub 27 of the friction member 28 creates a friction which does not allow the spring 31 to suddenly move the friction member 28 back into engagement with the fan pulley 14 and cause the fan to fluctuate.

To illustrate the operation of the fan still further, when the engine is running at a low speed the wind resistance on the fan 13 is not sufficiently great to cause release of the clutch facing 29 from the face 30 of the pulley 14. Therefore, when the engine is running at a low speed, the fan 13 will rotate in direct speed ratio to the crankshaft 18 from which it is driven. When the speed of the engine is increased to say 2000 R. P. M., the wind resistance on the fan 13 will be much greater than at lower speeds and will have a retarding action on the fan. Thus at the higher engine speed, the resistance on the fan 13 will cause the spring 31 to wind up, the spring being the driving means for the fan. The winding up of the spring 13 will tend to rotate the friction member 28 in a direction opposite to the rotation of the pulley 14. In so doing the screw threads 26 on the hub 27 of the friction member 28 will rotate on the threads 25 on the hub 19 in a direction opposite to the rotation of the pulley 14. The rotation of the hub 27 on the flanged hub 19 will move the same toward the fan 13 as viewed in Figure 2 and will cause the friction member 28 to disengage from the pulley 14 whereupon the fan 13 will cease to rotate in direct ratio to the speed of the engine. As viewed in Figure 2, when the clutch is released the fan 13 is free to rotate on its bearing 22 independently of the pulley 14 and not at the same speed therewith, so that no driving effort is used by the fan when the engine is running at the higher speeds.

As soon as the speed of the engine 10 is decreased to 2000 revolutions per minute or under, the spring 31 unwinds or lengthens and forces the friction member 28 to wind inwardly back into engagement with the fan pulley 14 so that artificial cooling of the engine 10 may again be had at these speeds.

It is plainly evident that the present invention overcomes the disadvantages encountered in fan constructions previously used and that the same provides an engine with more available horsepower above a speed of 2000 revolutions per minute than it would have if the fan were operated directly by the engine at all speeds thereof. It is of course, understood that the speeds of 2000 revolutions per minute were taken as a hypothetical case, and that the spring 31 can be designed to release the fan at any desired speed of the engine and that formal changes may be made in the specific embodiment of the invention described without departing from the spirit and substance of the broad invention, the scope of which is commensurate with the appended claims.

What I claim is:

1. Means for driving a cooling fan for an internal combustion engine comprising, a rotatable member driven by said engine, a friction element normally engaging said rotatable member, and a torsion spring having its extremities secured to said friction element and said fan for driving the same whereby, at predetermined speeds, the wind resistance to rotation of the fan will cause the torsion spring to shorten and disconnect the friction member from its engagement with the rotatable member.

2. Means for driving a cooling fan for an internal combustion engine comprising, driving means for said fan having a friction face, and means for disengaging said fan from said driving means at a predetermined speed of said engine comprising a friction member having a hub rotatably mounted on the hub of said fan, and a torsion spring for normally holding said friction member in engagement with the friction face on said driving means, and for moving said friction member out of engagement with said driving means when, above predetermined speeds, the wind resistance to rotation of the fan will cause the torsion spring to shorten to effect such disengagement.

3. Cooling means for an internal combustion engine, comprising a cooling fan having a hub formed with screw threads thereon, driving means for said fan, and means for disengaging said fan from said driving means at a predetermined speed of said engine comprising a friction member threaded on said fan hub normally engaging said driving means, and a torsion spring having its extremities secured to said driving means and said fan respectively providing the sole driving connection between said fan and friction member, said spring being adapted to move said friction member out of engagement with said driving means.

4. Cooling means for an internal combustion engine, comprising a cooling fan having a hub formed with screw threads thereon, a drive pulley having a friction face, and means for automatically disengaging said fan from said drive pulley comprising, a friction disc threaded on said fan hub normally engaging said drive pulley, and a torsion spring connecting said disc and fan hub for holding said friction disc in engagement with the friction face of said drive pulley up to a predetermined speed of said engine, said spring being adapted to automatically move said disc out of engagement with said drive pulley when the torque therein is less than the resistance to rotation of said fan.

5. Cooling means for an internal combustion engine comprising, a cooling fan, a pulley driven by said engine. a friction member normally engaging a face of said pulley, and a torsion spring connecting said friction member with said fan for driving the same, said spring being adapted to move said friction member out of contact with the face of said pulley at a predetermined speed of said engine by wind resistance to rotation of the fan.

6. Cooling means for an internal combustion engine comprising, a cooling fan, a rotatable member driven by said engine, a friction member screw threaded on the hub of said fan normally engaging a face of said rotatable member, and a torsion spring connected at its ends with said friction member and face respectively, said spring being adapted to rotate said friction member on the hub of said fan at a predetermined engine speed and move said friction member out of contact with said rotatable member by the wind resistance to rotation of said fan causing said spring to shorten and effect the disengagement of said friction member and said rotatable member.

7. Cooling means for an internal combustion engine comprising, a shaft supported by said engine, a cooling fan free to rotate on said shaft, a rotatable member fixed on said shaft driven by said engine, a friction member mounted on the hub of said fan to have movement in a spiral path thereon normally engaging a face of said rotatable member, and a torsion spring connected at its ends with said friction member and fan respectively, said fan being adapted to move said friction member in a spiral path on the hub of said fan at a predetermined engine speed to move said friction member out of contact with said rotatable member.

Signed by me at South Bend, Indiana, this 22nd day of February, 1928.

EDWARD C. NEWCOMB.